INVENTORS
Melvin S. Foster
Carl E. Crouthamel

Attorney 3,238,437
REGENERATION OF EMF CELLS HAVING MOLTEN METAL ELECTRODES AND A FUSED SALT ELECTROLYTE
Melvin S. Foster, Naperville, and Carl E. Crouthamel, Glen Ellyn, Ill., assignors to the United States of America as represented by the United States Atomic Energy Commission
Filed Dec. 21, 1962, Ser. No. 246,641
4 Claims. (Cl. 320—14)

The invention described herein was made in the course of, or under, a contract with the United States Atomic Energy Commission.

This invention relates to an E.M.F. cell having molten metal electrodes and a fused salt electrolyte.

The excellent electrical conductivity of fused-salts makes them especially suitable as electrolytes in E.M.F. cells. However, one difficulty in the present state of the E.M.F. cell art is the problem of regeneration. Economic feasibility of such E.M.F. cells will be dependent to a large degree on the use of some simple method for regeneration, which is especially important for operation in remote areas where a continuous supply of new reactants is not available.

The present invention is a solution for this difficulty and at the same time provides a means for converting heat such as that supplied by a nuclear reactor into electrical energy. Furthermore, the present invention provides a method for storage of electrical energy during low-demand periods of reactor operation.

It is an object of this invention to provide an E.M.F. cell system capable of self-regeneration.

It is also an object of this invention to provide a method for regeneration of an E.M.F. cell which utilizes the high electrical conductivity of fused salt electrolytes.

A further object of this invention is to provide a method for regeneration of a molten metal fused salt E.M.F. cell wherein the reaction products may be regenerated in situ.

Another object of this invention is to provide a method for regeneration of an E.M.F. cell while taking advantage of heat available from an energy source such as a nuclear reactor.

Still another object of this invention is to provide a method for regeneration of a molten metal fused salt E.M.F. cell by utilizing a part of the electrical output of a second E.M.F. cell.

We have found that an E.M.F. cell which has molten metal electrodes separated by a fused salt electrolyte may be electrochemically regenerated by a voltage considerably lower than the output voltage of the cell by raising the temperature of the cell significantly. As a result of this invention it is practical for the first time to regenerate an E.M.F. cell having electrode metals which have relatively high boiling points. Several combinations of such high boiling point metals have been found to produce unusually high current densities and relatively high output voltages.

The present invention may be better understood by reference to the following detailed description and the drawing in which.

Figure 1:
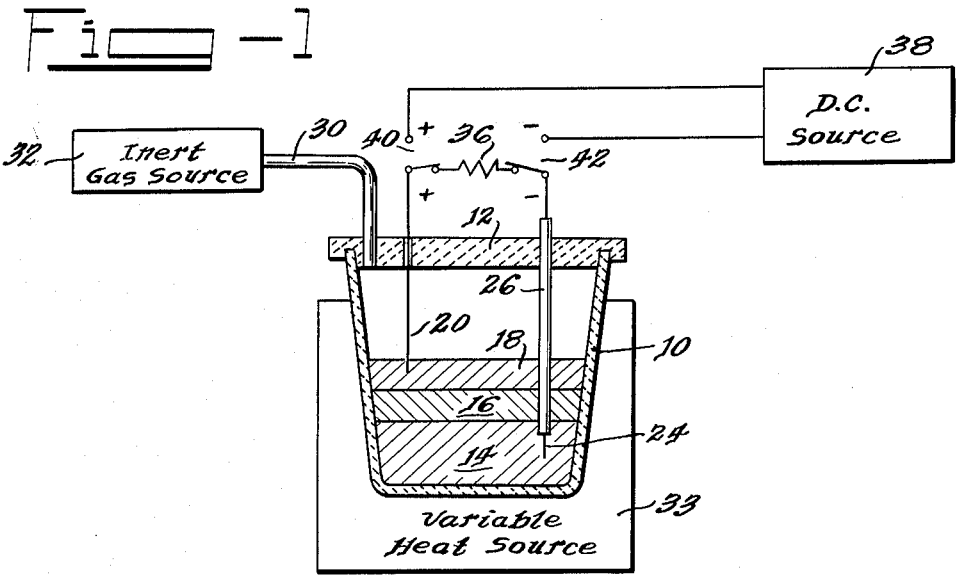
FIG. 1 is a sectional view in elevation partly digrammatic showing a single cell system which is operable according to the method of this invention.
Figure 2:
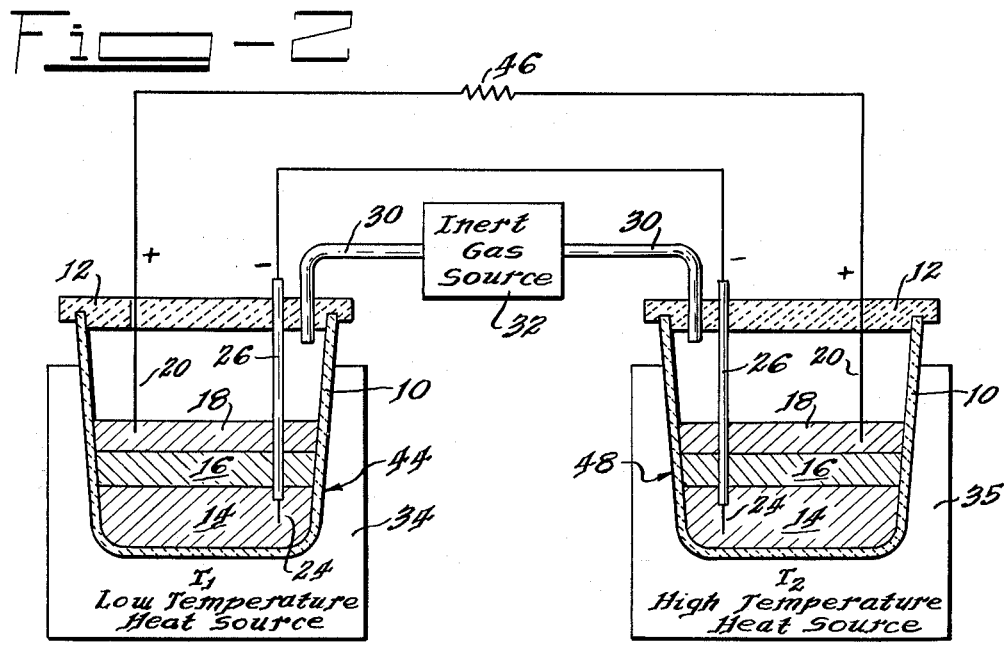
FIG. 2 is a sectional view in elevation partly diagrammatic showing a working cell operatively connected to a regenerating cell.

Referring to the drawings, a ceramic crucible 10 as shown in FIGS. 1 and 2 with a gas-tight ceramic cover 12 contains a molten metal cathode 14, a fused salt electrolyte 16 floating on the cathode metal 14, and a molten metal anode 18 floating on the electrolyte 16.

The cathode 14 must be a metal which is lower in the Electromotive Force Series than the anode metal 18 and at the same time must have a specific gravity greater than that of the anode. In addition both metals should be molten throughout approximately the same temperature range. We prefer to use bismuth as the cathode and lithium as the anode. While other metals may be used, lithium and bismuth not only suit the above requirements, but also generate a high E.M.F. and an unusually high current density.

The fused salt electrolyte 16 must be of a specific gravity intermediate between that of the anode and cathode metals in order to separate the two electrodes. The electrolyte must contain a cation of the more electropositive metal. Where the electrodes are lithium and bismuth, for example, the electrolyte may be lithium chloride. We prefer to add potassium chloride to the lithium chloride to form the eutectic in order to lower the melting point of the electrolyte. This is not intended to exclude the further addition of other fused salts for the purpose of further lowering the melting point of the electrolyte.

It is advantageous to select electrode metals and electrolyte which are molten at a relatively low temperature and which have relatively high boiling points. The output voltage is inversely related to the working cycle temperature and the voltage required for regeneration is inversely related to the cell temperature. Therefore, the greater the difference between the work cycle temperature $T_1$ and the regeneration cycle temperature $T_2$, the greater is the E.M.F. available for work in addition to that required for regeneration.

In FIG. 1 an anode lead 20 passes through the cover 12 and is immersed in the anode metal 18. A cathode lead 24 is encased for part of its length in a ceramic insulator 26 which provides electrical insulation from the molten electrolyte 16 and the molten metal anode 18. The insulator 26 passes through the cover 12. Beryllium oxide has proven to be a suitable ceramic for the crucible 10 and for the insulator 26 in a Li/LiCl-KCl/Bi system. The anode lead 20 and the cathode lead 24 may be high purity iron, tantalum, or such other metal as may be compatible with the electrode metals.

In order to prevent oxidation of the electrode metals the E.M.F. cell should be operated in an inert gas atmosphere. Such an atmosphere may be provided by purging the cells with an inert gas such as argon and by maintaining an inert gas atmosphere in each cell through a gas line 30 from an inert gas source 32 as shown in FIGS. 1 and 2.

Each E.M.F. cell is operated in conjunction with a suitable heat source which may be a variable-temperature heat source 33 as in FIG. 2, a fixed, low-temperature heat source 34 as in FIG. 2, or a fixed, high-temperature heat source 35 also shown in FIG. 2. For a working, or output cycle, the E.M.F. cell temperature should be slightly above the melting point of the components.

For a regeneration cycle the E.M.F. cell to be regenerated according to the method of this invention is raised to a temperature substantially higher than the working cycle temperature. However, the regeneration temperature should be less than the boiling point of any of the components of the E.M.F. cell.

The E.M.F. cell as shown in FIG. 1 completes a work cycle through a work load 36. Then the cell may be regenerated by raising the temperature of the heat source 33 and applying a voltage of reversed polarity from a D.C. source 38 through switches 40 and 42. The applied voltage according to this invention is less than that generated by a charged cell during the work cycle.

In FIG. 2 a self-regenerative E.M.F. cell system is shown in which a working cell 44 operates at a low temperature $T_1$ doing work through a work load 46 which is in series with the working cell. At the same time part of the output of the working cell 44 is used to regenerate a second cell 48 at a higher temperature $T_2$. $T_1$ and $T_2$ are adjusted so that the voltage required to regenerate cell 48 is preferably about two thirds the voltage generated by cell 44. The second cell 48 is electrically connected in series opposition to the working cell 44 and in series with the work load 46. In this system a discharged working cell and a regenerated cell are interchanged and a new work cycle is initiated as soon as the respective cells reach temperatures $T_1$ and $T_2$.

It is possible to increase the higher temperature $T_2$ so that only one half of the E.M.F. of the working cell is required for regeneration of the second cell. This would make available a higher E.M.F. for doing useful work. However, in most cases such a temperature would be higher than that normally available from nucellar reactor heat exchange units.

The following examples show typical applications of the present invention.

*Example I*

About 400 grams of bismuth and about 40 grams of LiCl–KCl eutectic are placed in a beryllium oxide crucible having an inside diameter of about two inches. The crucible and contents are heated in a furnace or other suitable heat source to about 360° C. which is slightly above the melting point of the LiCl–KCl eutectic. To protect the melt from contact with air, this and all subsequent operations are carried out in an argon atmosphere.

About 30 grams of lithium is added to the surface of the LiCl–KCl eutectic in such a manner that there is no electrical contact between the liquid bismuth and the lithium except through the molten eutectic which serves as the electrolyte. An anode lead of high purity iron is positioned in the molten lithium. A similar lead is inserted into the bismuth and is electrically insulated from the lithium and from the electrolyte. At this point the voltage drop between the lithium anode and the bismuth cathode through an infinite external resistance is about 1.0 volt.

In order to regenerate this cell the temperature is raised to about 970° C., and a variable D.C. voltage source adjusted to deliver about 0.7 volt is connected in series opposition to the anode and cathode leads as shown in FIG. 1. This cell when 80% spent has delivered about 123,000 ampere-seconds (about 34 ampere-hours) and requires a like amount for regeneration.

*Example II*

The E.M.F. cell described in Example I, when spent, is regenerated at about 970° C. by connecting a second, fresh E.M.F. cell in series opposition with the cell to be regenerated. The fresh cell is operated at a temperature above but close to 360° C. in order to obtain maximum output voltage. Under these conditions the output voltage of the fresh cell is about 1.0 volt. The voltage drop across the cell being regenerated is about 0.67 volt. A load is connected in series with the fresh cell and the cell being regenerated. The load is added to obtain useful work from the fresh cell while regenerating the spent cell. The resistance of the load is adjusted to require no more than about 0.33 volt, or about one third the output voltage of the fresh cell.

When the fresh cell is spent, the regenerated cell is cooled to about 360° C. while the spent cell is heated to about 970° C. Then the cells are connected in series opposition with a load in series as described above and the regenerating cycle is repeated.

*Example III*

The E.M.F. cell described in Example I, when spent, is regenerated at about 1290° C. by connecting a second, fresh E.M.F. cell in series opposition therewith. The fresh cell is operated at about 360° C. Under these conditions only about 0.5 volt, or one half of the output voltage of the fresh cell, is required for regeneration of the spent cell. Therefore, the resistance of a load connected in series with the fresh cell and the spent cell is increased over that used in Example II so that about 0.5 volt, or one half of the output of the fresh cell is used for useful work in addition to that used for regeneration of the spent cell.

When the fresh cell is spent, the regenerated cell is cooled to about 360° C. while the spent cell is heated to about 1290° C. These cells are again connected in series opposition with a load in series as described above while the regeneration cycle is repeated.

We have found that a Li/LiCl–KCl/Bi E.M.F. cell is capable of producing unusually high current densities at low voltages. For example, one cell similar to that in Example I above which was operated at 490° C. with an external resistance of $15 \times 10^{-4}$ ohms yielded 1599 milliamperes of current per square centimeter of electrode contact area at 0.01 volt. With a 0.1 ohm resistance the cell yielded 664 milliamperes per square centimeter.

It would be impractical to regenerate such a cell as this without the present invention, especially if one depended on the vaporization of an electrode metal for regeneration of the cell. Vaporization requires a large amount of latent heat which the present invention does not require. Lithium and Bismuth both have high boiling points as well as a high free energy of combination which makes these metals especially suited to the present invention. We have applied this invention to several other electrode metal combinations such as Li–Zn, Li–Sn, Li–Cd, Li–Pb, and Li–Te.

Regeneration according to the present invention is accomplished within the cell container. There is no need to rehandle or isolate any of the cell components during either work or regeneration cycles.

This E.M.F. cell is ideally suited for use as an energy storage cell capable of being held indefinitely in a "frozen" state at room temperature. There is no corrosion problem associated with such storage and there is no loss of electrical energy during such storage. Regeneration for storage may be carried out during off-peak periods of reactor operation thereby conserving heat which might be lost otherwise.

It will be understood that the invention described herein may be modified within the scope of the appended claims.

What is claimed is:

1. A method for regeneration of an E.M.F. cell having dissimilar molten metal electrodes separated by a fused salt electrolyte, comprising: raising the temperature of the electrodes and electrolyte to a temperature substantially above the melting points of the electrodes and electrolyte; and applying a D.C. voltage in series opposition to said electrodes, said applied voltage being substantially less than that delivered by the E.M.F. cell during the working cycle.

2. The method of claim 1 in which the applied voltage is a part of the working voltage of a second E.M.F. cell.

3. A method for conversion of heat from a heat source to electrical energy, comprising: heating a first electrically regenerable E.M.F. cell to a work cycle temperature by said heat source; doing work with about half of the output voltage of said first E.M.F. cell; electrically regenerating a second regenerable E.M.F. cell with the balance of the voltage of said first E.M.F. cell, said second E.M.F. cell being electrically connected in series opposition therewith and being heated by said heat source to a regeneration temperature which is sufficiently high to permit regeneration of the second E.M.F. cell at about half the output voltage of the first E.M.F. cell; and repeating the above steps with said first and second E.M.F.

cells interchanged when said first E.M.F. cell requires regeneration.

4. A regenerable storage type E.M.F. cell system, comprising: a first E.M.F. cell having a fused salt electrolyte interposed between two dissimilar molten metal electrodes, said first E.M.F. cell being in a fresh condition; a low temperature heat source in thermal contact with said first cell having a temperature slightly above the highest melting point of the electrolyte and metal electrodes; a second E.M.F. cell similar to the first E.M.F. cell and electrically connected in series opposition therewith, said second E.M.F. cell being a spent condition; a high-temperature heat source in thermal contact with said second E.M.F. cell having a temperature somewhat lower than the lowest boiling point of said electrolyte and molten metals; and means electrically connected in series with said first and second E.M.F. cells for performing work with part of the output voltage of the first E.M.F. cell such that the balance of said output voltage is sufficient for simultaneous regeneration of said second E.M.F. cell.

References Cited by the Examiner
UNITED STATES PATENTS 2,291,739   8/1942   McGrath ---------- 136—83.1

LLOYD McCOLLUM, *Primary Examiner.*

L. R. CASSETT, T. J. MADDEN, *Assistant Examiners.*